UNITED STATES PATENT OFFICE.

JOHN ALEXANDER HUNTER, OF BRADFORD, PENNSYLVANIA.

PROCESS OF CONVERTING CAST-IRON INTO STEEL OR MALLEABLE IRON AND THE PRODUCT SO OBTAINED.

SPECIFICATION forming part of Letters Patent No. 719,117, dated January 27, 1903.

Application filed May 17, 1902. Serial No. 107,864. (No specimens.)

*To all whom it may concern:*

Be it known that I, JOHN ALEXANDER HUNTER, a citizen of the United States, and a resident of Bradford, in the State of Pennsylvania, have invented certain new and useful Improvements in Processes of Converting Cast-Iron into Steel or Malleable Iron and the Product so Obtained, of which the following is a full, clear, and exact description.

My invention relates generally to the manufacture of steel or malleable iron from cast-iron, and particularly to the method of decarbonization by subjecting the cast-iron in a muffle, crucible, or open furnace in a highly-heated state to the action of acids or gases derived from acids evolving oxygen. In prior patents, No. 498,062, dated May 23, 1893, and No. 600,948, dated March 22, 1898, are described certain methods employing acids or gases from acids involving this principle of decarbonization, and I refer to them for a fuller description of such details of manipulation as are not hereinafter referred to or fully described.

The object of my present invention is to effect such decarbonization without the usually-resulting scaly incrustation of the iron and also to produce in the resultant metal a capacity for taking a higher temper.

To these ends my present invention consists, stated broadly, in subjecting cast-iron at high temperature, less than melting, in a suitable mechanical device to the action of a mixture of nitric acid and sulfuric acid or to the gases evolved therefrom under the action of applied heat.

In practically carrying out my new process the cast-iron, in the form of white castings, bars, or blocks, is put in a muffle, crucible, retort, open furnace, or other suitable mechanical device in which it may be heated. When the iron is in a highly-heated state and considerably below the melting-point, I apply thereto in the furnace an acid mixture compounded by adding two parts, by volume, of nitric acid of commerce to three parts, by volume, of sulfuric acid of commerce. Twenty pounds of this acid mixture properly and fully applied will be sufficient to completely act on one ton of iron castings to produce the chemical and physical changes therein and above referred to, which I have discovered will result from my new means and method of procedure.

In practically exhibiting the acid mixture to the heated castings the following is to be observed, namely: It is to be applied to the cast-iron not when the latter has reached a molten state, but considerably before—namely, when it is hot enough to decompose the said acids named or at or about that known temperature at which the gases evolved therefrom will chemically unite with carbon.

The principle involved is of course the evolution of oxygen and the consequent decarbonization, to a greater or lesser extent, of the iron castings; but my method and means not only eliminate a part of the carbon, but convert the remainder or a part thereof into a graphite carbon of a peculiar character apparently different from the graphite carbon found in pig-iron and also produce the carbon of cementation, which, as well known, gives strength to converted iron castings. The exact proportions stated of acid mixture to weight of castings to be heated will vary slightly but not in substance from that stated where a very large quantity of castings is treated at one time, and the duration of time for the reaction on it of the acid mixture or its gases controls the more or less completeness or extent of the decarbonization and conversion of the castings. This duration of time may vary slightly, but not in substance, as the skilled operator in applying my process will naturally seek to utilize fully the described effect of the acid mixture or the gases evolved therefrom so exhibited—namely, in decomposing it to obtain its contained oxygen. If, however, the treatment described does not produce a converted mass giving in subsequent usual manipulation the requisite qualities to the full extent sought for, the treatment described may be repeated until it is obtained.

In practically applying the acid mixture to the iron castings in the furnace I prefer to mix with it some inert substance, such as sand, to prevent the too-sudden evaporation of it by the heated metal. If applied in a liquid or semiliquid condition, it may be introduced into the furnace under the iron by means of pipes or through the perforated bottom of the furnace, such as the furnace described in a United States patent granted to me, No. 699,759, dated May 13, 1902. The acid mixture may, however, though not preferably, be previously converted into a gas or gases in a separate vessel and then applied in a gaseous form through suitable conduits to and beneath the heated iron in the furnace.

The operator applying my process will observe the absence of the usual incrusting scale on the iron treated—a novel characteristic effect of my new process—and the resulting converted product of the process will admit of an unusually high temper and take on an edge like tool-steel.

Having thus described my invention, what I claim as new, and desire to secure by Letters Patent, is—

1. The process described of converting iron castings in the manufacture of steel and malleable iron, which consists in submitting cast-iron at a high heat but below fusing-point, in a suitable mechanical device, to the action of a mixture of nitric and sulfuric acids substantially in the proportions stated.

2. The process described of converting iron castings in the manufacture of steel and malleable iron, which consists in submitting cast-iron at a high heat but below fusing-point, in a suitable mechanical device, to the action of the gases evolved by the application of heat to nitric acid and sulfuric acid admixed in the proportion of two parts by volume of nitric acid to three parts by volume of sulfuric acid substantially as described.

3. The process described of converting iron castings in the manufacture of steel and malleable iron, which consists in submitting cast-iron at a high heat but below fusing-point, in a suitable mechanical device, to the action of a semiliquid mixture of nitric and sulfuric acids with an inert substance such as sand, substantially as described.

4. The new product adapted to be tempered, rolled or hammered into steel or malleable iron, which results from heating cast-iron in a suitable furnace, and when the metal is at high heat and below fusing, subjecting it to the action of gases evolved from heating an admixture of nitric and sulfuric acids; substantially as set forth.

In testimony whereof I have hereunto affixed my signature this 9th day of May, A. D. 1902.

JOHN ALEXANDER HUNTER.

Witnesses:
   EDWIN E. TAIT,
   H. T. FENTON.